(No Model.) 2 Sheets—Sheet 1.
P. R. DE F. D'HUMY.
GLOBE OR SHADE FOR LAMPS OR LANTERNS.

No. 401,934. Patented Apr. 23, 1889.

Attest
E. Arthur
Geo. E. Cruse

Inventor
Paul Raoul de F. D'Humy
By Knight Bros.
Attys.

(No Model.) 2 Sheets—Sheet 2.

P. R. DE F. D'HUMY.
GLOBE OR SHADE FOR LAMPS OR LANTERNS.

No. 401,934. Patented Apr. 23, 1889.

Attests
E. Arthur
Geo. E. Cruse

Inventor
Paul Raoul de F. D'Humy
By Knight Bros.
Attys

UNITED STATES PATENT OFFICE.

PAUL RAOUL DE FAUCHEUX D'HUMY, OF CLAPHAM RISE, COUNTY OF SURREY, ENGLAND.

GLOBE OR SHADE FOR LAMPS OR LANTERNS.

SPECIFICATION forming part of Letters Patent No. 401,934, dated April 23, 1889.

Application filed October 9, 1888. Serial No. 287,693. (No model.)

*To all whom it may concern:*

Be it known that I, PAUL RAOUL DE FAUCHEUX D'HUMY, electrician, a citizen of the Republic of France, residing at 2 Carlton Mansions, Clapham Rise, in the county of Surrey, England, have invented certain new and useful Improvements in Globes or Shades for Lamps or Lanterns; and I do hereby declare that the following is a full, clear, and exact description of the invention, which will enable others skilled in the art to which it appertains to make and use the same.

My invention consists in globes, shades, or glasses to be used with the electric or any other light, constructed in the following manner:

I will describe my invention by the aid of the accompanying drawings, in which—

Figure 2:
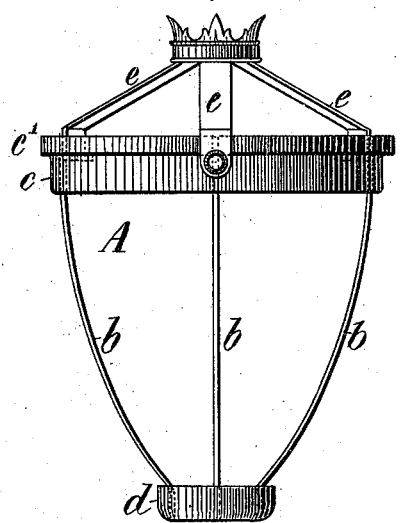
Figure 1:
Figure 3:
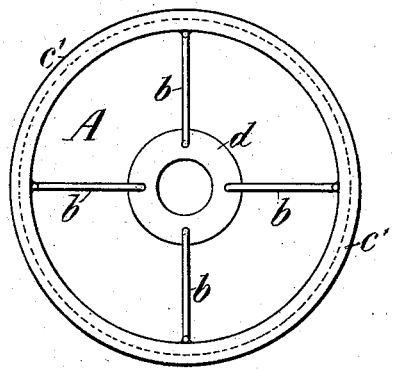

Figure 1 represents the manner of mounting the beads. Fig. 2 is an elevation of one form of the frame. Fig. 3 is a plan of the same with the upper portion or holder removed. Figs. 4, 5, 6, 7, 8, 9, 10, and 11 represent different forms of the frame and methods of applying the beads, as will appear more fully hereinafter.

Figure 4:
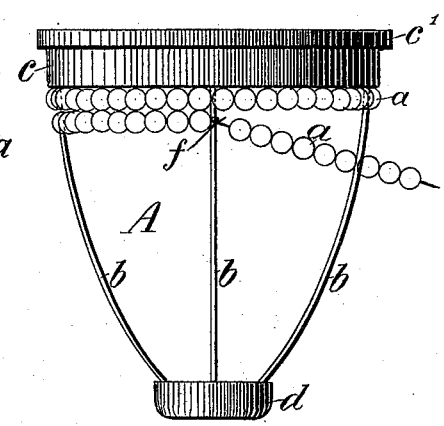

I take beads, crystals, or other forms of glass, or of white or colored crystal, which I thread on wire and thus form a chain, $a$, as represented at Fig. 1. I construct a foundation or frame, A, of stout wire or rods, having the form of the globe, shade, glass, lamp, or lantern I desire to obtain. At Figs. 2 and 3 I have represented one form of frame or foundation A, which is constructed of stout wires or rods $b$, soldered to rings $c$ $d$, thus forming a strong foundation or frame of the desired form. The ring $c$ may, as shown, be formed with a flange, $c'$, by which the article may be supported from a suitable holder, $e$. I then proceed to wind the chain $a$ of beads or crystals around such foundation or frame A, as shown at Fig. 4, until it is completely covered, taking care to bind the chain of beads or crystals to each rod or wire $b$ by means of a fine binding-wire, $f$.

Figure 5:
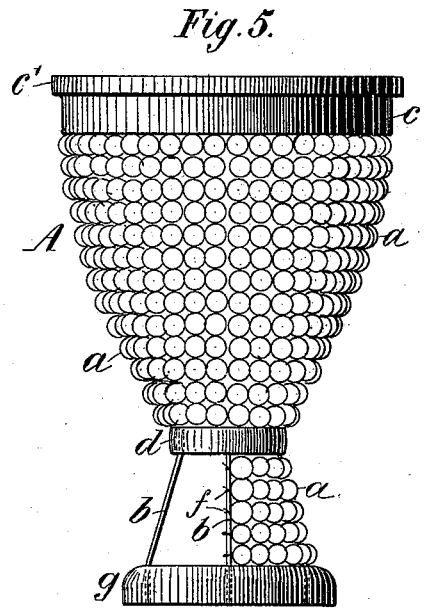

Fig. 5 represents a slight modification in the form of the article. In this case the rods or wires $b$ are extended beyond the ring $d$ and are attached to a ring $g$, forming a foot on which the article may stand on a table or other place.

Figure 6:
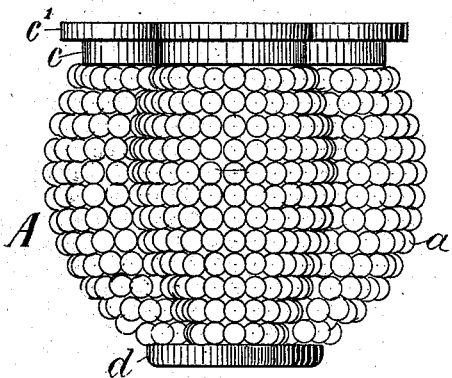
Figure 7:
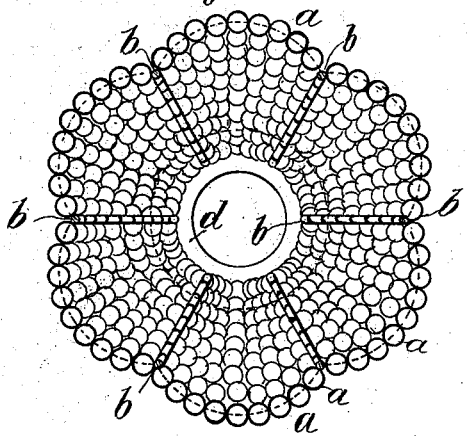
Figure 9:
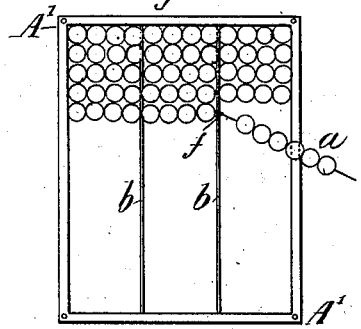
Figure 10:
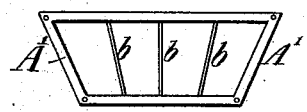

Figs. 6 and 7 are respectively an elevation and a sectional plan of a globe, shade, glass, lamp, or lantern, the frame or foundation of which is formed in a similar manner to that shown at Figs. 1, 2, and 3, but of slightly different shape. In the present case the beads or crystals are threaded upon somewhat stiffer wire than that used in the forms shown at Figs. 2 to 5, and instead of passing direct from one wire or rod $b$ to the next the chain of beads or crystals is caused to bulge outward between such rods or wires $b$, so as to give to the article somewhat the form of a melon.

Figure 8:
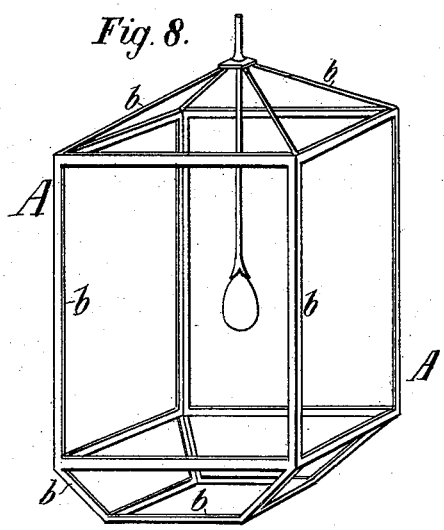

Fig. 8 represents a frame or foundation for a square-shaped lamp or lantern, which may be made either with or without a door in one side thereof. This frame or foundation is made of rods or bars $b$, firmly soldered together, and it may have wires or rods $b$ intermediate of the angles of such frame, in which case the chain of beads or crystals may be applied directly to such frame or foundation in the manner described with respect to the previous figures or supplemental frames; or foundations A' for each side or section of the article—such as those represented at Figs. 9 and 10—may be employed, which are separately covered with chains $a$ of beads or crystals in the manner hereinbefore described, in which case the supplemental frames or foundations A' are, when covered with chains of beads or crystals, screwed to the main frame or foundation A.

Figure 11:
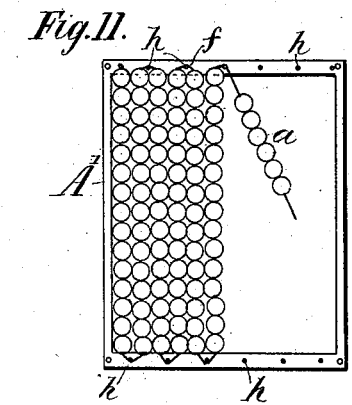

If desired, when employing a frame or foundation of a square or cylindrical form, such frame or foundation may be provided on its upper and lower bars or rings with studs or projections $h$ at regular intervals, to which the chain of threaded beads or crystals can be attached, such chain passing in vertical lines from top to bottom of the foundation or frame, as represented at Fig. 11.

In order to render the work more solid and firm, I submit the articles when they are completely formed to an electroplating process, whereby I cause metal to be deposited on the wires, thereby increasing their size and causing them to fill the apertures through the beads or crystals and at the same time connect the wires firmly to the bars or rods.

It will be readily understood that I do not confine myself to the forms of globe, shade, glass, lamp, or lantern represented in the drawings, as my invention is capable of being produced in a vast variety of forms, according to taste and requirements; nor do I confine myself to the material of which the frame or foundation is formed.

Having now particularly described and ascertained the nature of my said invention and in what manner the same is to be performed, I declare that what I claim is—

1. A globe, shade, glass, lamp, or lantern for the electric or other light, consisting of a strong frame or foundation covered with chains of threaded translucent beads or crystals, substantially as herein shown and described.

2. A globe, shade, glass, lamp, or lantern for the electric or other light, consisting of a strong frame or foundation and supplemental frames covered with chains of threaded translucent beads or crystals fixed thereto, substantially as herein shown and described.

3. In the manufacture of globes, shades, glasses, lamps, or lanterns for the electric or other light, the combination of a strong frame or foundation with chains of threaded translucent beads or crystals fixed thereto by means of fine binding-wires, and the electroplating process over the metallic parts, substantially as herein shown and described.

4. In a shade for lamps, &c., the combination, with a suitable frame having projections, of a string containing a number of translucent beads, crystals, or equivalent articles wound upon said frame and having the string engaged by said projections.

5. In a shade for lamps, &c., the combination of a suitable frame, a string containing a number of translucent beads or equivalent articles mounted on a stiff core and applied to said frame with the desired bending or curving of said core between parts of the frame, and securing-wires by which the said core is bound to the parts of the frame where it crosses the same, substantially as set forth.

PAUL RAOUL DE FAUCHEUX D'HUMY.

Witnesses:
B. J. B. MILLS,
CLAUDE K. MILLS,
Both of 23 Southampton Buildings, London.